(12) United States Patent
Liao

(10) Patent No.: US 6,642,974 B2
(45) Date of Patent: Nov. 4, 2003

(54) ASSEMBLY OF BACKLIGHT MASK

(76) Inventor: Chun-Chi Liao, 6F, No. 15-2, Lane 420, Sec. 5, Cheng-Kung Road, Nei Hu Area, Taipei (TW)

( * ) Notice: Subject to any disclaimer, the term of this patent is extended or adjusted under 35 U.S.C. 154(b) by 185 days.

(21) Appl. No.: 09/867,222

(22) Filed: May 29, 2001

(65) Prior Publication Data

US 2002/0180896 A1 Dec. 5, 2002

(51) Int. Cl.[7] ............................................. G02F 1/1335
(52) U.S. Cl. ....................................................... 349/64
(58) Field of Search ............................ 345/87; 40/361; 349/64, 15

(56) References Cited

U.S. PATENT DOCUMENTS 6,269,565 B1 * 8/2001 Inbar ........................... 40/361

* cited by examiner

*Primary Examiner*—John F. Niebling
*Assistant Examiner*—André C Stevenson
(74) *Attorney, Agent, or Firm*—Ostrolenk, Faber, Gerb & Soffen, LLP

(57) ABSTRACT

An assembly of backlight mask is provided for lowering peripheral temperature of a LCD panel during operation so as to heighten efficiency and lifetime of the LCD panel, wherein the LCD panel is segregated from heat generated by a backlight device of the backlight mask; an insulation sheet is disposed between the backlight device and the LCD panel; and a plurality of vents and fans are provided to a base of the backlight mask for expelling heat generated from the backlight device.

3 Claims, 5 Drawing Sheets

ASSEMBLY OF BACKLIGHT MASK

FIELD OF THE INVENTION

This invention relates to the backlight mask structure, particularly to a backlight mask with an insulation sheet.

BACKGROUND OF THE INVENTION

Compared with a conventional cathode-ray monitor, a Liquid Crystal Display (LCD) device is more advantageous in power consumption, portability, resolution, continuous picture display, etc., therefore it becomes popular gradually to have a great chance to substitute for the conventional though it is still more expensive so far. As known until now, LCD has been already applied in notebook computer, vehicle navigation, wall TV, High Definition TV (HDTV), etc.

A conventional LCD device mainly comprises a backlight mask device and a LCD panel, wherein the backlight mask device further comprises a base, a reflection sheet, a ground device, an electrode plate, a lamp, and a divergent guiding board, wherein the divergent guiding board is mounted on the base.

As the LCD device is very sensitive to its peripheral temperature, thus when the ambient atmosphere is overheated, the permeability of a LCD panel and its lifetime will be considerably degraded or shortened. Moreover, the LCD panel can be viewed only when a light source provided by the backlight mask device is available. However, unfortunately, under thickness limitation of the LCD, thermal radiation of the backlight mask device is considered a major factor that heats the surroundings of the LCD panel up, which is the main issue seeking for a solution.

SUMMARY OF THE INVENTION

The primary object of this invention is to provide an assembly of backlight mask for lowering peripheral temperature of a LCD panel during operation so as to heighten efficiency and lifetime of the LCD panel.

In order to realize abovesaid object, a LCD panel is segregated from heat generated by a backlight device of the backlight mask of this invention, wherein an insulation sheet is disposed between the backlight device and the LCD panel; and a plurality of vents and fans are provided to a base of the backlight mask for expelling heat generated from the backlight device.

For more detailed information regarding advantages or features of this invention, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE INVENTION

Figure 1A:
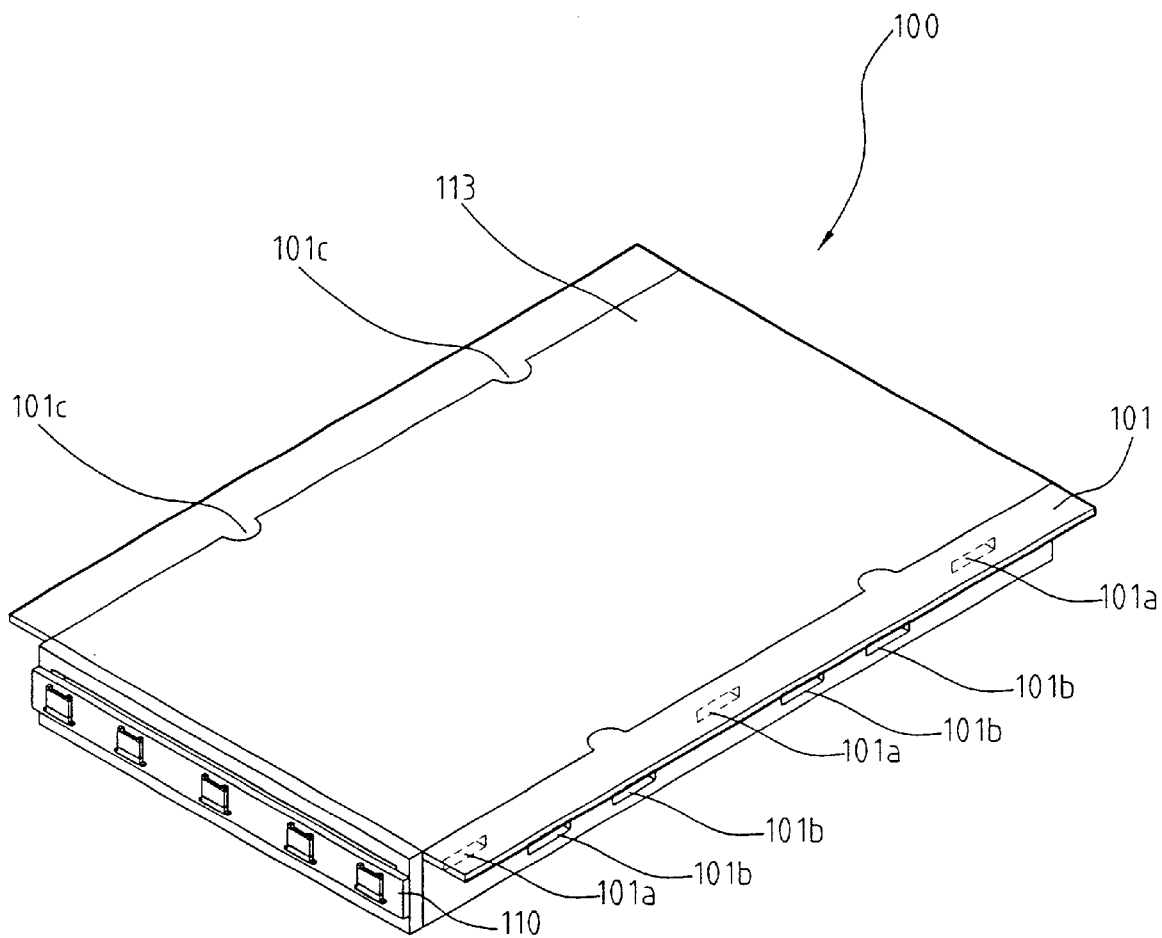
FIG. 1A is a schematic view showing the appearance of this invention.

An assembly of backlight mask of this invention shown in FIG. 1A is characterized in comprising: a plurality of vents formed on a flank of base 101 of the backlight mask 100 for dissipating heat generated from the backlight mask 100; and a plurality of protruding pieces 101c disposed on the base 101 for easy mounting or dismounting a divergent guiding board.

Figure 1B:
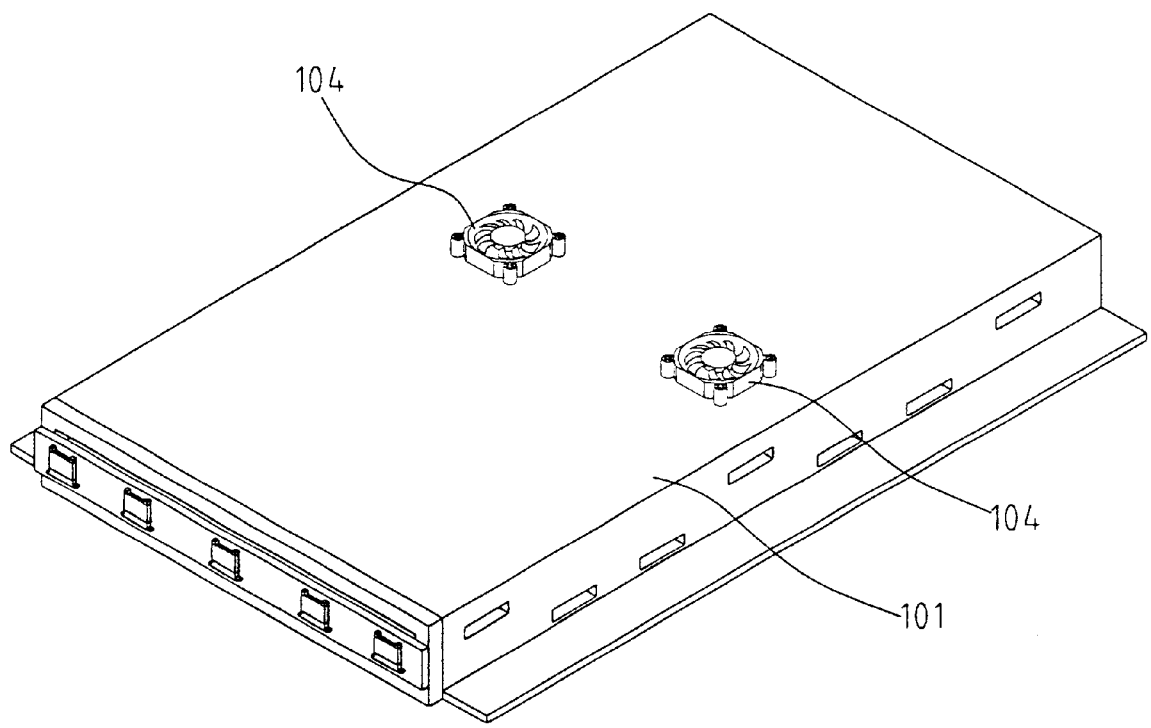
FIG. 1B is a schematic bottom view of the appearance of this invention.

According to a bottom view of the backlight mask 100 shown in FIG. 1B, a plurality of fans 104 is fixedly distributed on the base 101 of the backlight mask 100 for assisting heat dissipation of a backlight device of the backlight mask 100.

Figure 2:
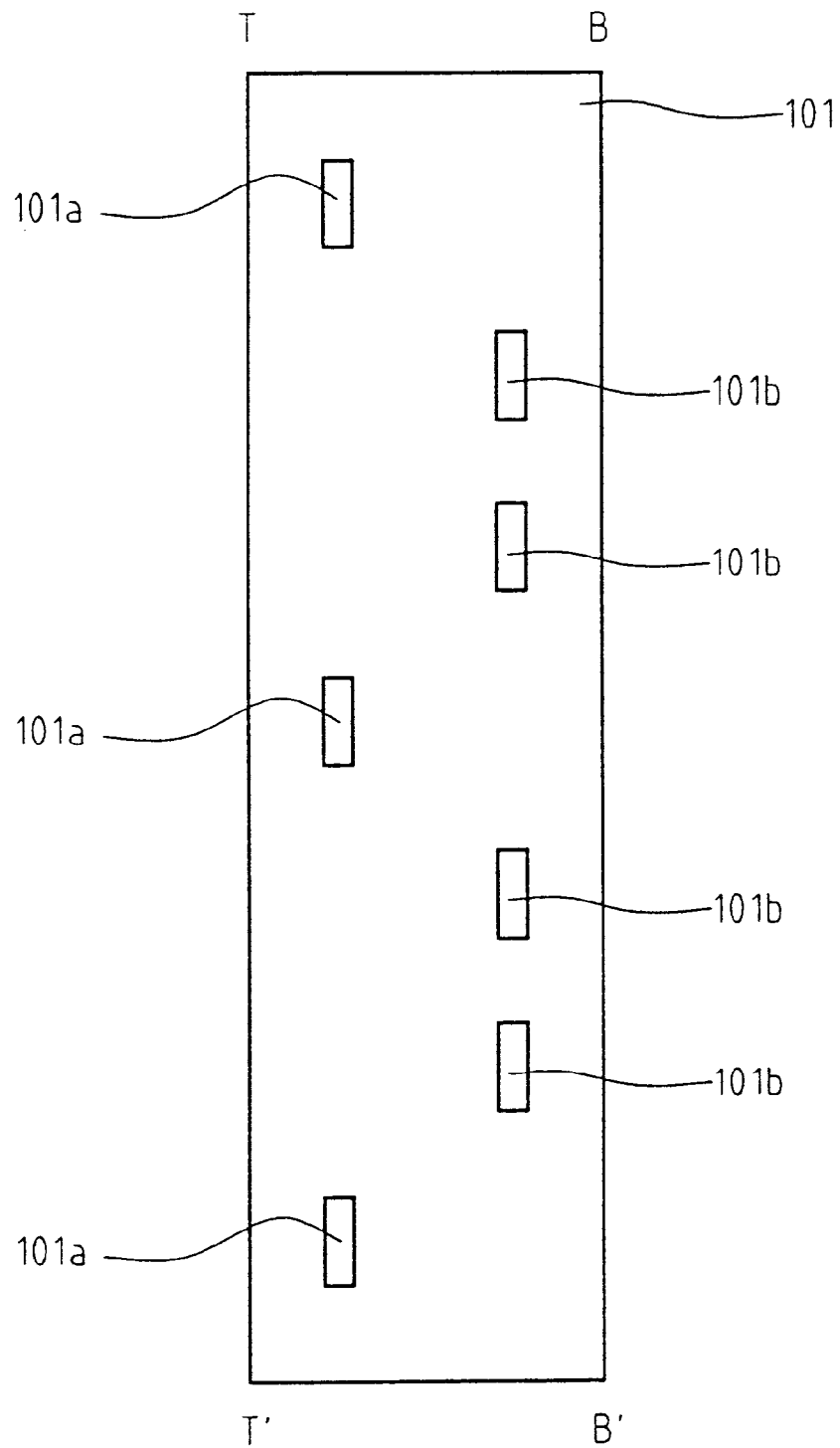
FIG. 2 is a lateral view of this invention.
Figure 3:
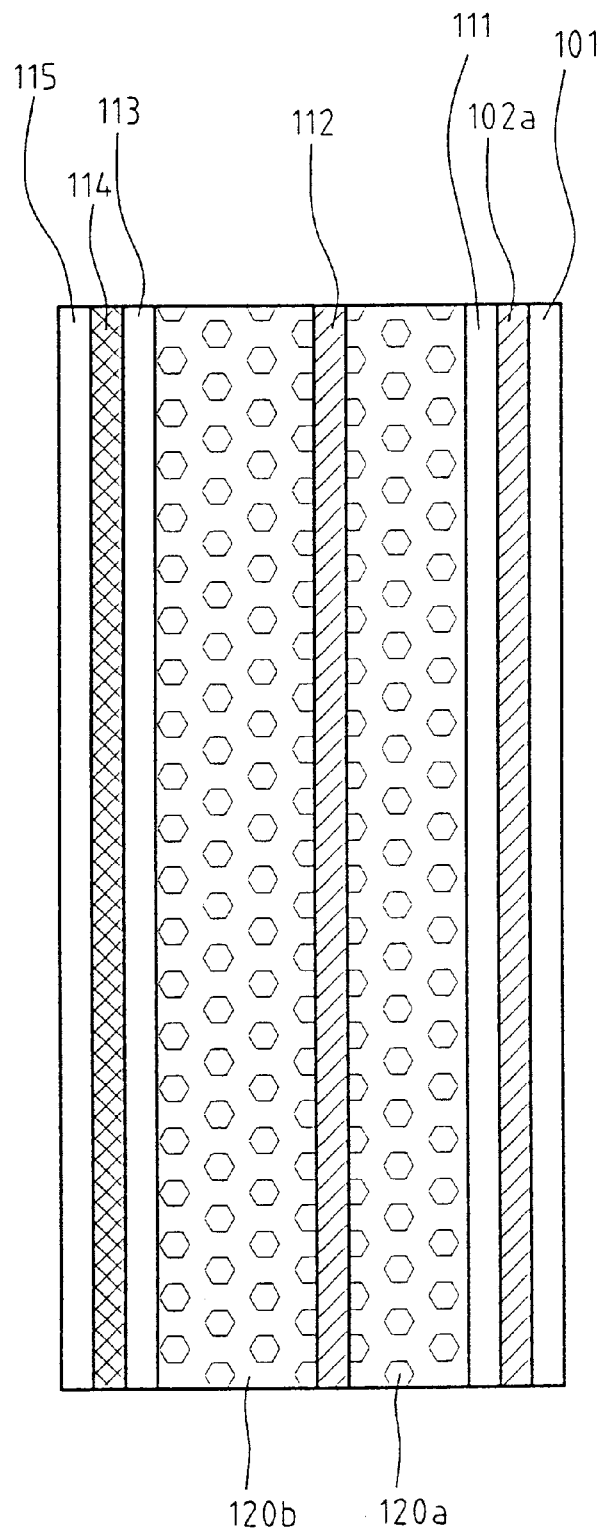
FIG. 3 is a lateral sectional view of this invention.

In a lateral view of the base 101 shown in FIG. 2, BB' and TT' express the bottom end and the top end of the backlight mask 100 respectively, wherein a plurality of holes aligned in two rows is arranged in the base 101 between the bottom end BB' and the top end TT' of the backlight mask. The holes are divided into two parts: a plurality of plugging holes 101a for setting an insulation sheet 112 (shown in FIG. 4) by plugging its protruding feet 112a in the holes 101a; and a plurality of vents 101b located between the insulation sheet 112 and the bottom end BB' of the backlight mask 100, wherein the distance from an arbitrary vent 101b to the bottom end BB' is shorter than that between an arbitrary plugging hole 101a and the bottom end BB'. FIG. 3, a lateral sectional view of this invention, shows the construction of sheet structures and two secluded compartments 120a, 120b formed between the base 101 of the backlight mask 100 and a divergent guiding board 113.

As shown FIG. 3, the structure layers of the backlight mask 100 sequentially include the base 101, a reflection sheet 102a, a bulb set 111, the insulation sheet 112, the divergent guiding board 113, a light-collecting sheet 114, a protective sheet 115, and the compartments 120a, 120b.

The insulation sheet 120 is provided for splitting the space enclosed by the bottom face of the base 101 and the divergent guiding board 113 into two secluded sub-spaces, namely, the compartments 120a, 120b so that the heat generated from the bulb set 111 is blocked by the insulation sheet 112 from diffusing to the divergent guiding board 113 and accordingly to the light-collecting sheet 114, the protective sheet 115 in order not to heat a LCD panel set on the top face of the backlight mask 100, and instead, is expelled through the vents 101b for keeping the temperature of the backlight mask 100 under normal state.

Figure 4:
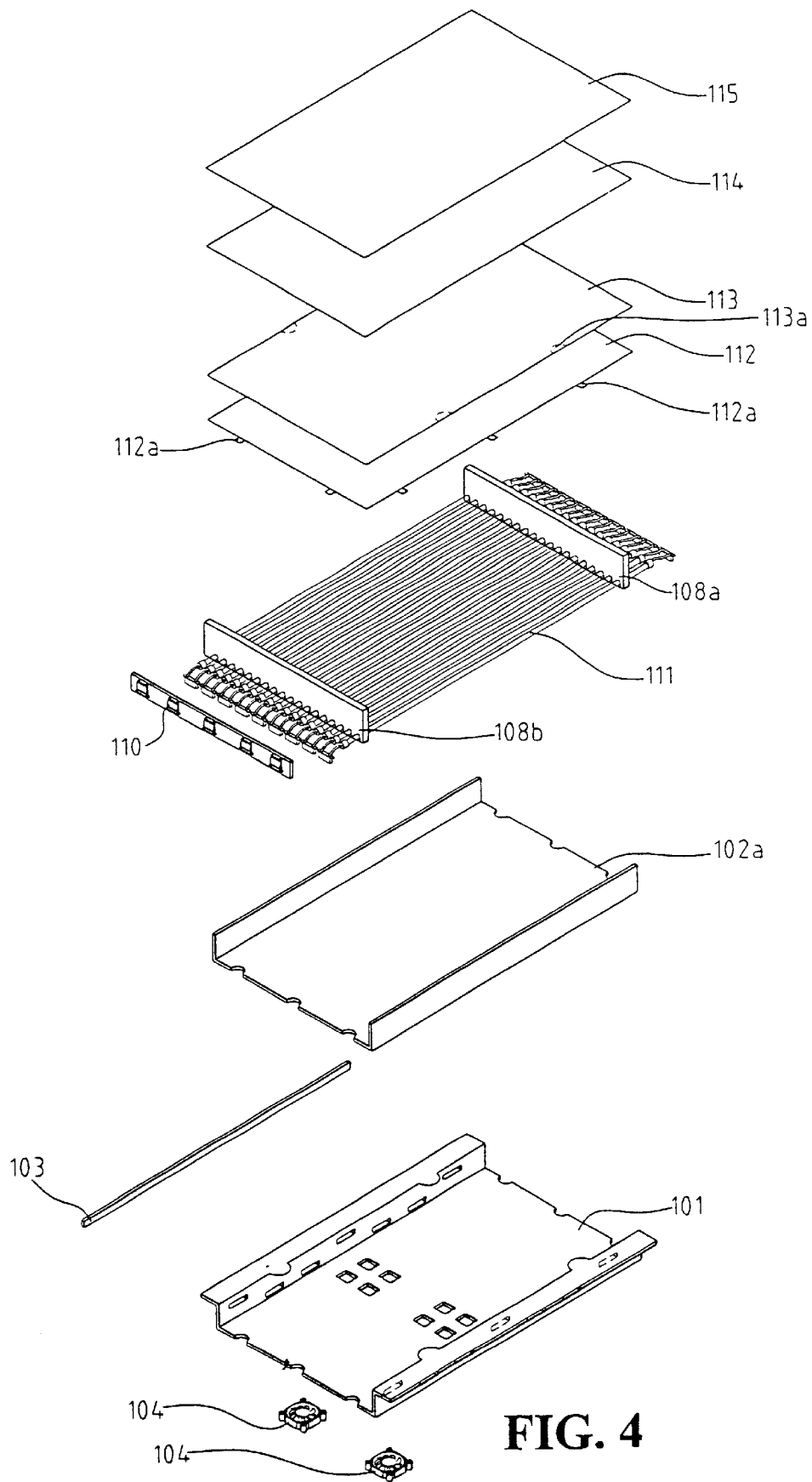
FIG. 4 is an exploded view of this invention.

The components of this invention can be scrutinized from an exploded view shown in FIG. 4, wherein the insulation sheet 112 is disposed between a backlight device of the backlight mask 100 and the LCD panel for the purpose of blocking heat conduction to the latter; the plurality of vents 101b is arranged on the base 101 laterally for dispersing heat; the plurality of fans 104 is disposed on the base 101 for extracting and expelling inside hot air; and the protruding pieces 101c of the base 101 are provided for setting the divergent guiding board 113 by snap-jointing with a groove 113a formed on the guiding board 113.

Moreover, a plurality of divergence dots formed on the divergent guiding board 113 is distributed at positions corresponding to the light sources of the backlight device for diverging luminance flow emitted from the backlight device to unify the luminance intensity on the LCD panel.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A backlight mask assembly, comprising:

a base having a flank, the flank of the base including a plurality of vents;

a backlight device coupled to the base;

a liquid crystal display; and an insulation sheet arranged between the backlight device and the liquid crystal display;

wherein the insulation sheet is operable to prevent heat generated by the backlight device from diffusing therethrough, and the plurality of vents are operable to disperse the heat generated by the backlight device.

2. A backlight mask assembly, comprising:

a base having a bottom, the bottom of the base including a plurality of fans;

a backlight device coupled to the base;

a liquid crystal display; and an insulation sheet arranged between the backlight device and the liquid crystal display;

wherein the insulation sheet is operable to prevent heat generated by the backlight device from diffusing therethrough, and the plurality of fans are operable to expel the heat generated by the backlight device.

3. A backlight mask assembly, comprising:

a base;

a backlight device coupled to the base, the backlight device including a plurality of light sources;

a divergent guiding board detachably coupled to the base, the divergent guiding board including a plurality of divergence dots aligned with the light sources of the backlight device;

a liquid crystal display; and an insulation sheet arranged between the backlight device and the liquid crystal display;

wherein the insulation sheet is operable to prevent heat generated by the backlight device from diffusing therethrough.

* * * * *